United States Patent [19]

Bunce et al.

[11] 3,723,654

[45] Mar. 27, 1973

[54] GROUP SWITCHING ARRANGEMENT FOR KEY TELEPHONE SYSTEMS

[75] Inventors: Michael Kelly Bunce, Denver; Stanley Edward Bush, Boulder; George Arthur Fargo, Jr., Denver; George Edwin Saltus, Boulder, all of Colo.

[73] Assignee: Bell Telephone Laboratories, Incorporated, Murray Hill, Berkeley Heights, N.J.

[22] Filed: Dec. 22, 1970

[21] Appl. No.: 100,582

[52] U.S. Cl. .............. 179/2 TV, 179/99, 179/27 CA, 179/18 AD

[51] Int. Cl. .............. H04m 11/00

[58] Field of Search ....179/27 CA, 18 AD, 99, 2 TV, 179/1 CN; 178/DIG. 13

[56] References Cited

UNITED STATES PATENTS

| | | | |
|---|---|---|---|
| 3,591,725 | 7/1971 | Morse | 179/18 AD |
| 3,573,377 | 4/1971 | Anderson | 179/2 TV |
| 3,101,393 | 8/1963 | Desnoes | 179/27 CA |
| 3,508,011 | 4/1970 | Dehlen | 179/27 CA |

*Primary Examiner*—Kathleen H. Claffy
*Assistant Examiner*—Thomas D'Amico
*Attorney*—R. J. Guenther and James Warren Falk

[57] ABSTRACT

Equipment is disclosed for selectively establishing exclusive group connections between a number of key stations and a common wideband-audio communication facility in response to a key depression at one of the stations. The equipment can also automatically route incoming calls on the facility to a prescribed group of key stations. In addition, apparatus controllable by stations within each key group is disclosed for transferring calls to stations in other groups.

12 Claims, 6 Drawing Figures

INVENTORS M. K. BUNCE
S. E. BUSH
G. A. FARGO, JR.
G. E. SALTUS

BY Henry J. Walsh
ATTORNEY

GROUP SWITCHING ARRANGEMENT FOR KEY TELEPHONE SYSTEMS

BACKGROUND OF THE INVENTION

This invention relates generally to communication switching arrangements and, more particularly, to key telephone systems for providing wideband communication services to groups of key stations.

DESCRIPTION OF THE PRIOR ART

The introduction of wideband switching equipment into the general telephone plant creating the prospect of nationwide video dialing is spawning an increasing demand for wideband services in such special switching areas as key telephone systems. Telephone subscribers, particularly business subscribers who are the largest users of key equipment, are becoming increasingly aware of the many communication possibilities inherent in the new communication dimension. Notwithstanding this increasing subscriber interest, wide acceptance of the new service has been hampered by the high cost of wideband channels and its accessory control equipment. To reduce this cost various key telephone arrangements which may be characterized as "shared" channel arrangements have been developed to enable many key stations to access a single wideband channel.

In key systems the concept of sharing audio communication facilities is well established. A single audio line may be associated with pickup keys at numerous key stations and, if two or more of these keys are depressed, many key stations can be bridged together on a single audio line. For the business subscriber the sharing of an audio line in this manner has the distinct advantage of distributing the call traffic load and decreasing the number of lost calls due to no answers. Video transmission paths, however, cannot be connected to more than one key station at a time. If a second key station service unit is bridged onto the video path, the video synchronization signals are distorted and the video picture is destroyed. Thus, in video switching arrangements, wideband paths cannot be simply shared in the same sense as audio lines.

Present shared video-audio arrangements employ what is referred to as a hierarchical sharing scheme. Preferred stations can cut off the video image to lesser preferred stations at any time by depressing the pickup key associated with the common path. This eliminates the possibility of more than one key station being connected to the wideband channel. The hierarchical scheme is preferred in particular installations such as "-boss-secretary" telephone arrangements. Incoming calls, initially answered by the secretary, are ordinarily transferred to the boss, who would prefer to have an exclusive video channel to the caller. However, apart from such special arrangements, the hierarchical scheme, if expanded to accommodate many key stations, has manifest disadvantages. One of its principal drawbacks is that it necessitates the ranking of all personnel connected to the common channel into more preferred and less preferred station users. Such ranking in many instances is not acceptable, and the subscriber is required to increase the number of wideband channels and reduce the number of key stations sharing each channel until an acceptable compromise is attained.

It is therefore an object of this invention to provide an arrangement for sharing a common wideband, or data, facility among many key telephone stations such that the facility becomes substantially a private video-audio channel for a key station connected to it.

It is also a further object of this invention to furnish an improved arrangement giving equal access to a single wideband channel by a plurality of key station groups wherein the stations within each group are arranged in a hierarchical connecting order.

SUMMARY OF THE INVENTION

These and other objects of the invention are achieved in accordance with our preferred embodiment in which a key telephone system is furnished with equipment which is selectively controlled on a per call basis to exclusively associate a wideband-audio facility with a limited number of key stations. When the facility is idle, it is available to all key stations on a first-come-first-served basis. Upon the actuation of the first pickup key at any key station, a group connection is made between a key station group which includes the enabling station, and the facility. Thereafter, access to the audio and wideband paths of the facility is limited exclusively to the few stations of a controlling key group. On incoming calls, the equipment automatically associates the facility exclusively with a predetermined group of key stations as soon as the call is detected.

In the embodiment, a key group can consist of one or more key stations. For example, a station requiring exclusive access to both the audio and video paths of the facility can be solely assigned to a group. Thus, a group connection to this group is in effect a private line connection to the single station. Stations requiring preferred, nonpreemptable access to the video path of the facility can be grouped with other key stations having less stringent service requirements. Since the stations within a group are grouped in a hierarchical order, the preferred station can preempt or exclusively maintain video connections.

Each station group, advantageously, can be organized in accordance with traffic needs of the stations making up the group. The likelihood of inadvertent intrusion on established calls is minimized because only a few stations at one one time exclusively utilize the common facility. Thus, a major drawback of the prior art arrangements for sharing a single wideband channel among many key stations is effectively overcome.

The common facility comprises an audio and a wideband path which connect to a Private Branch Exchange, PBX, or to a Central Office, CO. Establishment of a group connection effectively extends those paths to all the stations of the controlling group. If the enabling station dials an audio-only call, the audio portion of the facility only is utilized. However, the entire facility remains in the exclusive control of the controlling group until the audio-only call is terminated.

A group connection, although exclusive, can be transferred to another group under control of a station in the controlling group. Initially, the controlling group must relinquish its exclusive connection by depressing a "hold" key. This action signals the equipment to place the call presently on the facility in a hold condition and to release the group connection. Thereafter, if a key station in any group depresses a pickup key associated with the facility, the hold condition is removed and an exclusive group connection is established to the group containing the enabling station.

In accordance with one feature of the invention, a group control unit is associated with each group of key stations, and it cooperates with a group common control circuit to provide all stations with full access to a wideband channel when idle, and selected stations with exclusive access on a hierarchical basis to the video path of the facility.

In accordance with another feature of the invention, equipment is furnished to give full access to an audio line of the facility when idle and exclusive access to the audio line from all stations of a controlling group when the facility is seized.

In accordance with still another feature, the control unit can be controlled by any station of the controlling group to permit key stations outside of the controlling group to connect to the facility and to transfer exclusive control of the facility to a different group of key stations.

DESCRIPTION OF THE DRAWINGS

The foregoing objects, features, and advantages, as well as others of the invention, will be more apparent from the following description of the drawing, in which.

It will be noted that FIGS. 2 through 5 employ a type of notation referred to as "detached contact" in which an X shown intersecting a conductor represents a normally open contact of a relay and a bar shown intersecting a conductor at right angles represents a normally closed contact of a relay; "normally" referring to the unoperated condition of the relay. The principles of this type of notation are described in an article entitled "An Improved Detached Contact Type Schematic Circuit Drawing" by F. T. Meyer in the September 1955 publication of the *American Institute of the Electrical Engineers Transactions, Communications and Electronics*, Vol. 74, pages 505–513.

Figure 3:
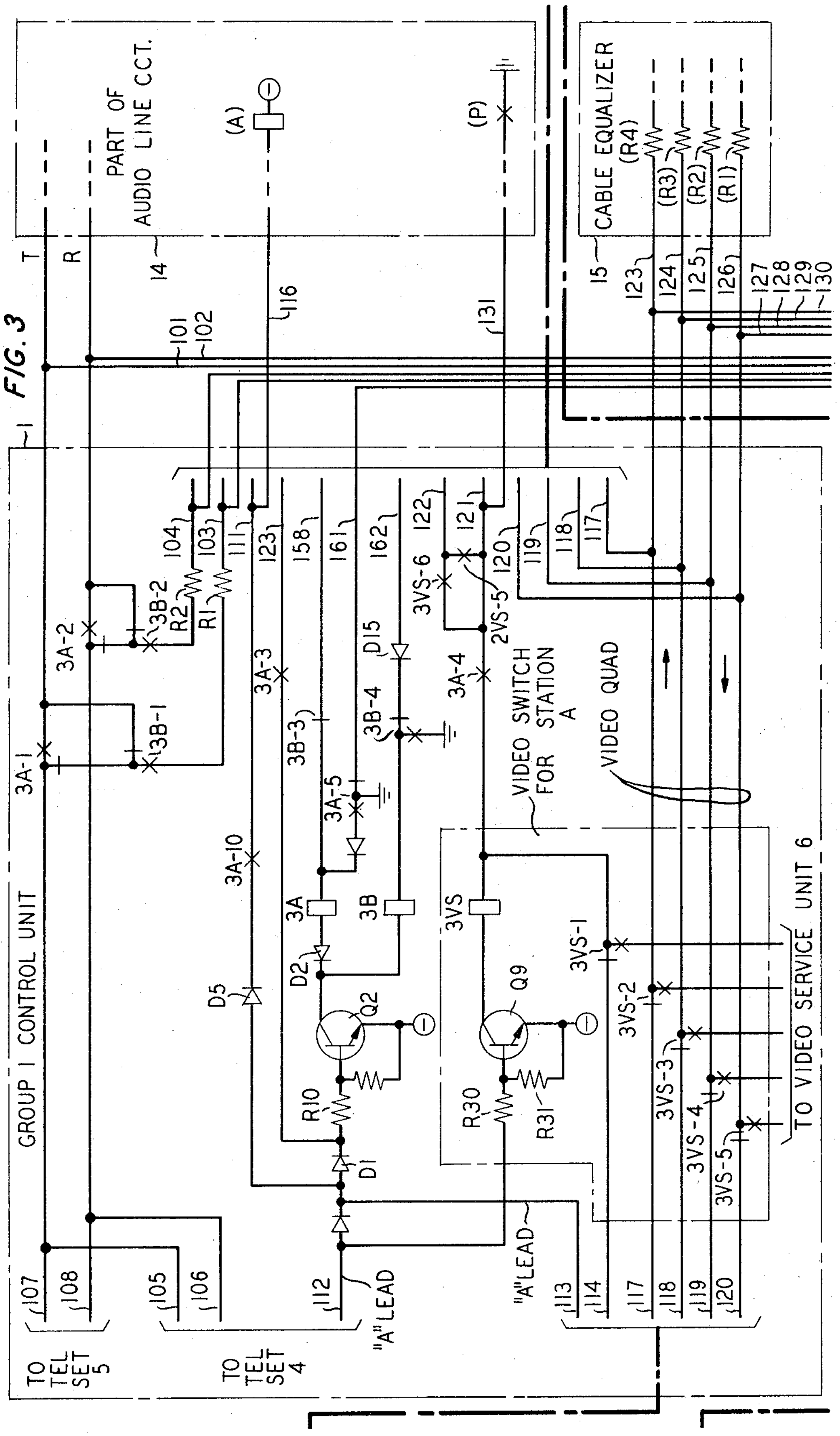
Figure 4:
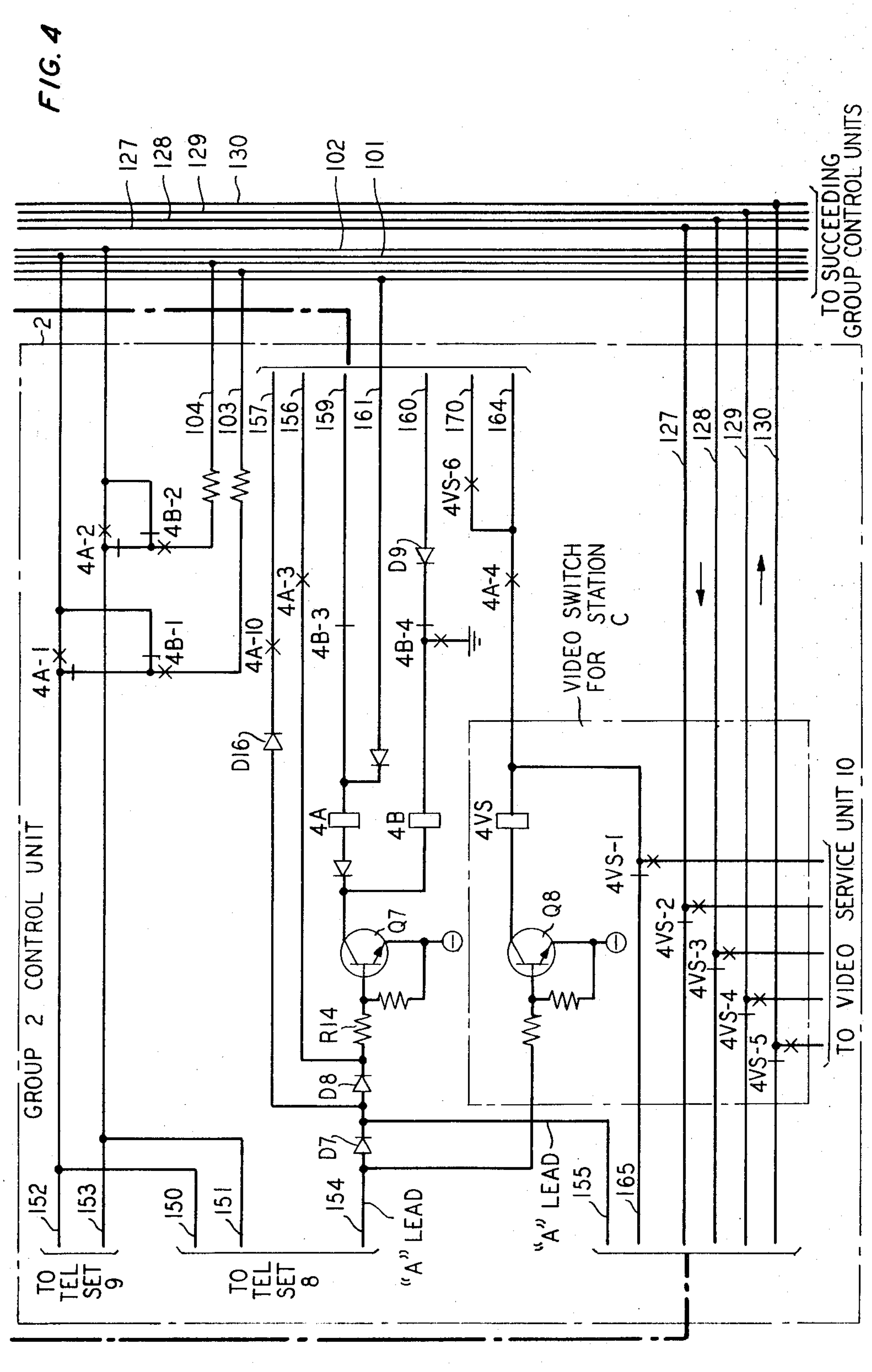

It will be noted also that in order to simplify the disclosure and thus facilitate a more complete understanding of the embodiment, the relays, relay contacts and other electromechanical devices shown in FIGS. 2 through 5 have been given systematic designations. The number preceding the letters of each device correspond to the figure in which the control circuit of the device is shown. Thus, the coil of relay 4VS is shown in FIG. 4. Each relay contact, either make, break, or transfer, is shown with its specific contact number preceded by the designation of the relay to which it belongs. For example, the notation 4VS–1 indicates contact number 1 of relay 4VS, the coil of which is shown in FIG. 4.

INTRODUCTION

Figure 1:
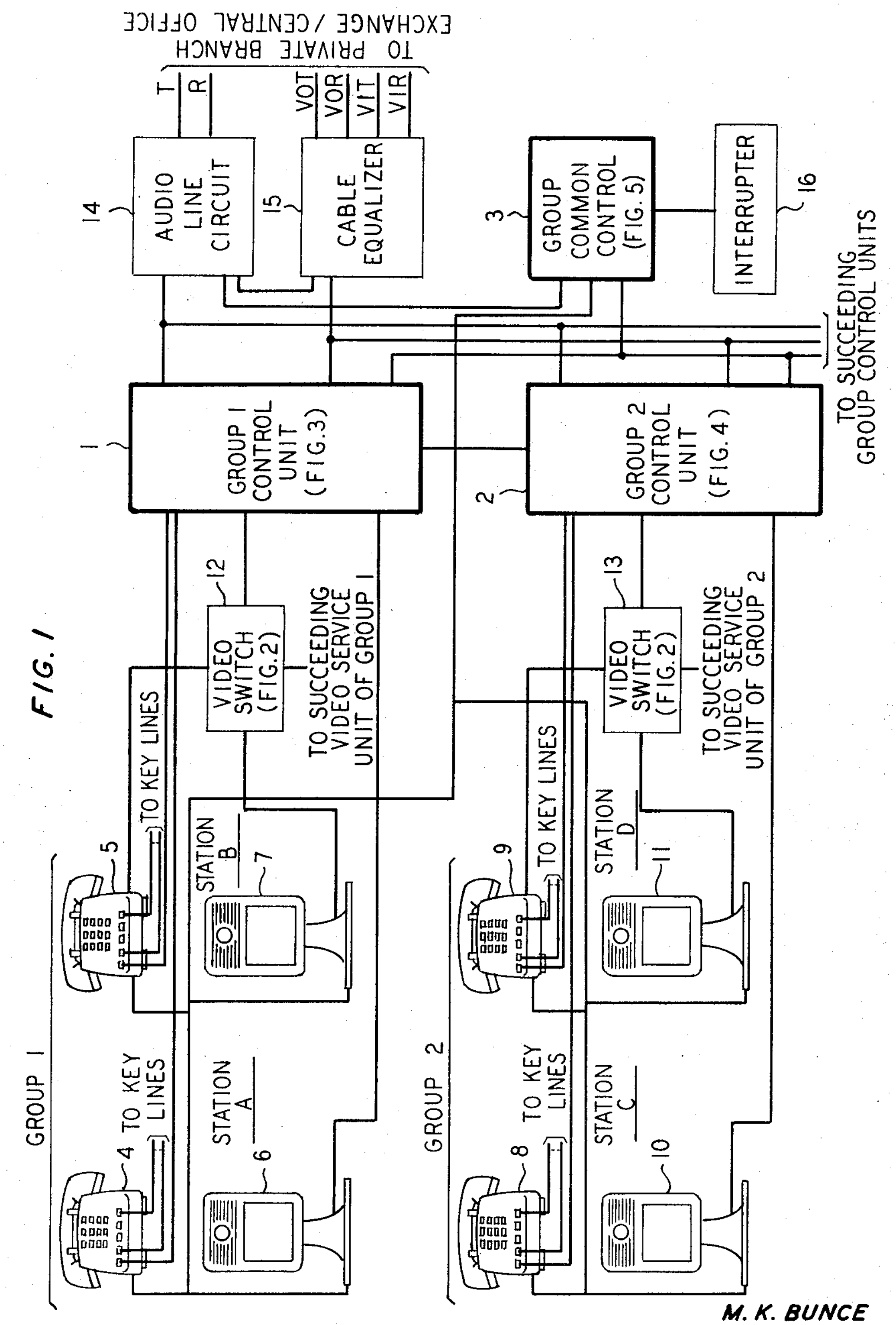
FIG. 1 is essentially a block diagram showing the interrelationship of the exemplary embodiment of the invention.
Figure 2:
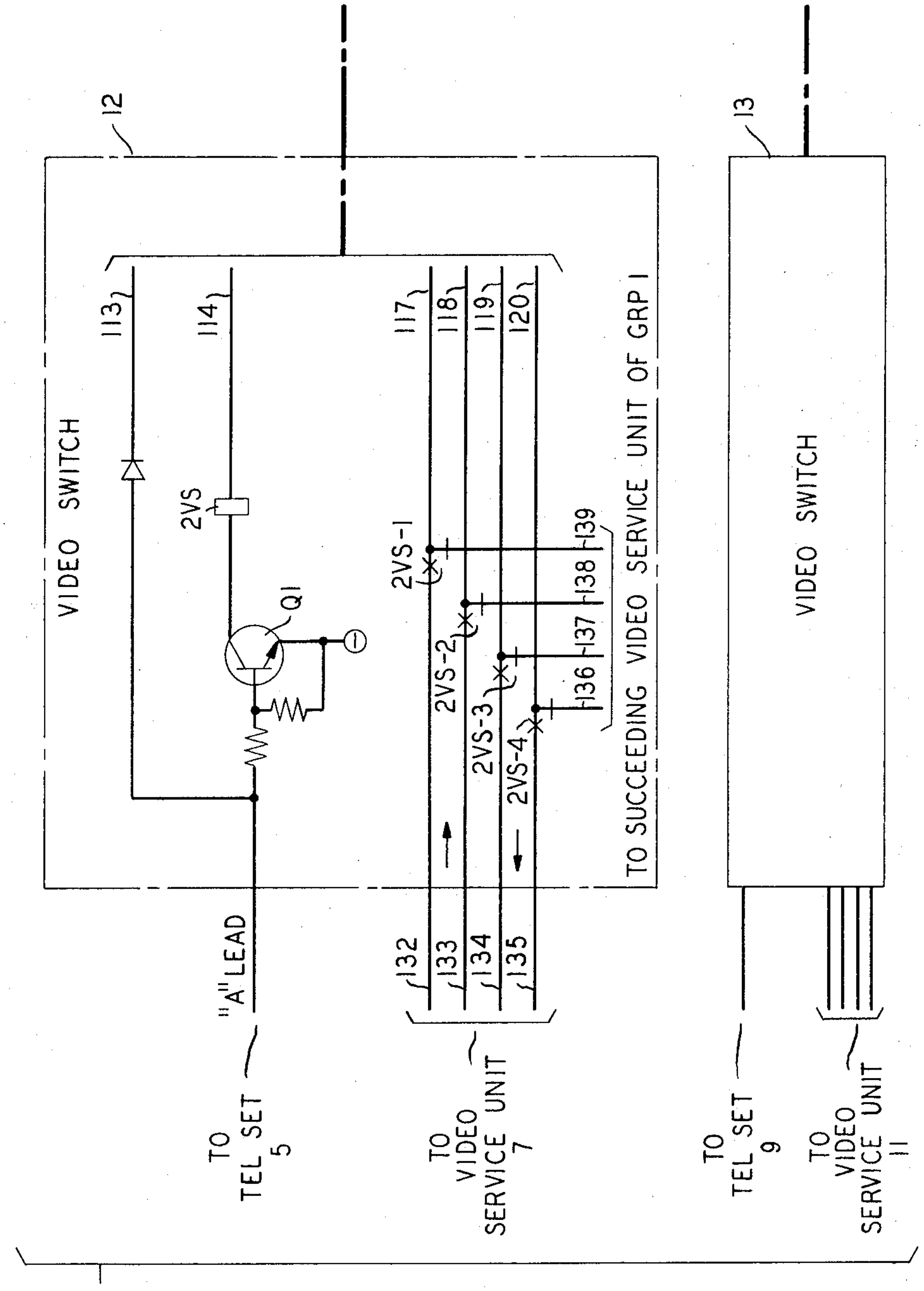
FIGS. 2 through 5 are schematic drawings showing in greater detail the interrelationship of the various components which comprise the exemplary embodiment.

The present invention is illustrated in a key telephone system in which any key station may be selectively connected to any one of a number of communication lines from a CO or PBX in response to the enabling of a key associated with that line. For purpose of this illustration, it is intended that the audio portion of the facility be completed through a line circuit in a manner well known in the art. The line circuit is shown in FIG. 1 as the block designated 14 and its circuitry is shown in part in FIGS. 3 and 4. The audio portion of the line circuit is described, for example, in U. S. Pat. No. 3,436,488 to R. Barbato et al., issued Apr. 1, 1969 and also in U. S. Pat. No. 2,850,579 to H. T. Carter, issued Sept. 2, 1958.

The high frequency wideband (video) signals are carried over four wires which are referred to generally as the "video quad" or "quad." The quad consists of a transmit pair of wires as well as a receive pair of wires. For purposes of the following discussion, some assumptions concerning the video transmission will be made. For example, it is assumed that prior to the extension of a wideband call via a PBX or CO and completion of a connection via the network of the PBX or CO to the conductors designated VOT, VOR, VIT, and VIR shown in FIG. 1, a bidirectional continuity test on the wideband quad is performed. Moreover, it is assumed that upon successful completion of this test, a signal is sent over the tested quad to the key equipment. It is further assumed that following this signal on incoming calls, a ringing signal is impressed on audio line conductors T and R in a manner well known in the art to signal the key equipment that an incoming call is in progress.

At times, the discussion touches upon the lamp indication at each key station. The present arrangement contemplates that each key position is equipped with a combined key-light assembly. The upstanding key portion in translucent, enabling a station user to view the indicating light of the assembly. These key positions are indicated in FIG. 1 as small squares in the base of the telephone set. The darkened square represents a convention hold key. Each key assembly contains a red and a clear lamp such as the assembly shown in U. S. Pat. No. 3,454,826 to S. Bush et al. of July 8, 1969. The red lamp is lighted when the video portion of the facility is in use and the clear lamp indicates an audio-only call. For details on the operation of the dual lamp assembly, reference should be made to the Bush patent. For purposes of this illustration, it is to be understood that the connection of a positive voltage to the assembly controls the red lamp, while a negative voltage on the same lead controls the clear lamp.

GENERAL DESCRIPTION

Referring to FIG. 1, there is disclosed in block diagram form the essential circuit elements which comprise a key station group switching arrangement. As shown therein, group 1 includes stations A and B. Station A comprises station set 4 and video service unit 6. Station B similarly includes set 5 and unit 7. The figure also discloses a group 2 which includes stations C and D containing respective sets 8 and 9 and units 10 and 11. It will be appreciated from the ensuing discussion that additional stations can be included in groups 1 and 2 as, for example, shown connecting to video switches 12 and 13; and additional groups of key stations can be added to the system for increasing the total number of key stations served by the single video quad and accompanying audio line. The manner in which additional key station groups may be added will be discussed in greater detail hereinafter. Connections to these additional groups and the group control units required for each group is shown in the lower right hand corner of FIG. 1. Although the figure discloses only four key stations and two key station groups, it is believed that this is sufficient to fully describe the features and advantages of the present invention.

The stations of groups 1 and 2 are arranged in a hierarchical order so that station A has preference over station B and station C has preference over station D. By preference it is meant that station A, for example, controls the connection of the video quad to service units 6 and 7 in such a way that station A can at all times cause the connection of the quad to service unit 6 when group 1 is the controlling group. More particularly, the circuitry of video switches 12 and 13 are controlled from respective station sets 5 and 9 to preempt the video image to all other service units (not shown) having a lower preference order. Circuitry similar to that contained in switches 12 and 13 is contained within units 1 and 2 and is controllable by stations A and C to preempt the video image between groups.

Connections from the video quad to key stations of groups 1 or 2 are controlled by control unit 1 and 2 (shown in heavy outline) in accordance with the keys depressed at those stations. The operation of units 1 and 2 is coordinated by a group common control 3 also depicted in heavy outline. Common control 3 contains the circuitry for limiting connections to a single key station group as well as the circuitry for controlling the call transfer of existing video-audio connections between groups. Audio connections are established from a PBX or CO switching network over leads T and R, audio line circuit 14, and via unit 1 to key stations of group 1 or via unit 2 to key stations of group 2. The video quad, leads VOT, VOR, VIT and VIR, passes through cable equalizer 15 and connects to the video service units via unit 1 and video switch 12 or via unit 2 and video switch 13.

When it is desired to establish an audio-video connection to a station, either for the initiation or for the reception of a call, the pickup key at the originating station associated with the facility is enabled. Accordingly, an audio transmission path is completed from the enabling station, through the enabled pickup key, the control unit assigned to the enabling station, and the audio line circuit to the audio line. At about the same time, the wideband path is reserved for connection to the service unit associated with the enabling station.

On an incoming video call, the CO or PBX applies a video supervisory signal (VSS) to the incoming video pair at least 100 milliseconds (ms) before a ringing signal is applied to the audio pair. During the 100 ms interval, cable equalizer 15 detects VSS and forwards a signal to audio line circuit 14 which is turned on in the video mode. As soon as the mode is established, line circuit 14 signals units 1 and 2, as well as video switches 12 and 13, via units 1 and 2, to stand by for a video call. When the ringing signal is detected by line circuit 14, it sends lamp and station ringer control voltages via common control 3 to each station set and to each video service unit sharing this facility.

A distinctive audible signal, as well as a distinctive lamp signal, alerts each key station to the incoming audio-video call. A feature of the present invention permits the selective ringing of prescribed key stations rather than all stations in order that such stations may act as answering positions. These answering stations are in the same group. As soon as one of the prescribed stations selects the call by depression of the associated pickup key, a signal is sent over the "A lead" to the associated group control units to direct that:

a. the audio line be connected to the stations of the key group,
b. common control 3 exclude connections to stations not in the enabling group, and
c. the video quad be connected to the particular enabling station within the answering group.

It is to be noted that the actual connection of the audio path to a particular key station is established through the pickup key contacts at that station in the customary manner.

The cable equalizer 15 which is interposed between units 1 and 2 and the video quad from the PBX or CO is arranged to provide constant video signal transmission parameters, regardless of the variations between each key station and the PBX or CO. In addition, cable equalizer 15 responds to signals from line circuit 14 to provide the CO or PBX upon interrogation therefrom with information regarding the availability of the video equipment of the key telephone system.

In the event it is desired to transfer an incoming video-audio call to a station in a different group, the answering station may disable the group lockout feature and thereby permit any other key station of the system to pick up the call. When the hold key of the answering station is depressed, a signal is forwarded via the associated control unit to disable the group lockout circuit in common control 3. The operation of this key also disconnects the answering station video service unit from the video quad and disconnects the station set from the audio path. Accordingly, the answering station may signal over a separate communication channel (not shown) to any one of the other key stations requesting them to pick up the call. When the transferee station depresses the pickup key for this facility, the hold condition is removed, the controlling group is changed to the group which now includes this station, and the audio and video paths of the common facility are connected through to the station set and video service unit of the transferee station.

DETAILED DESCRIPTION

Figure 5:
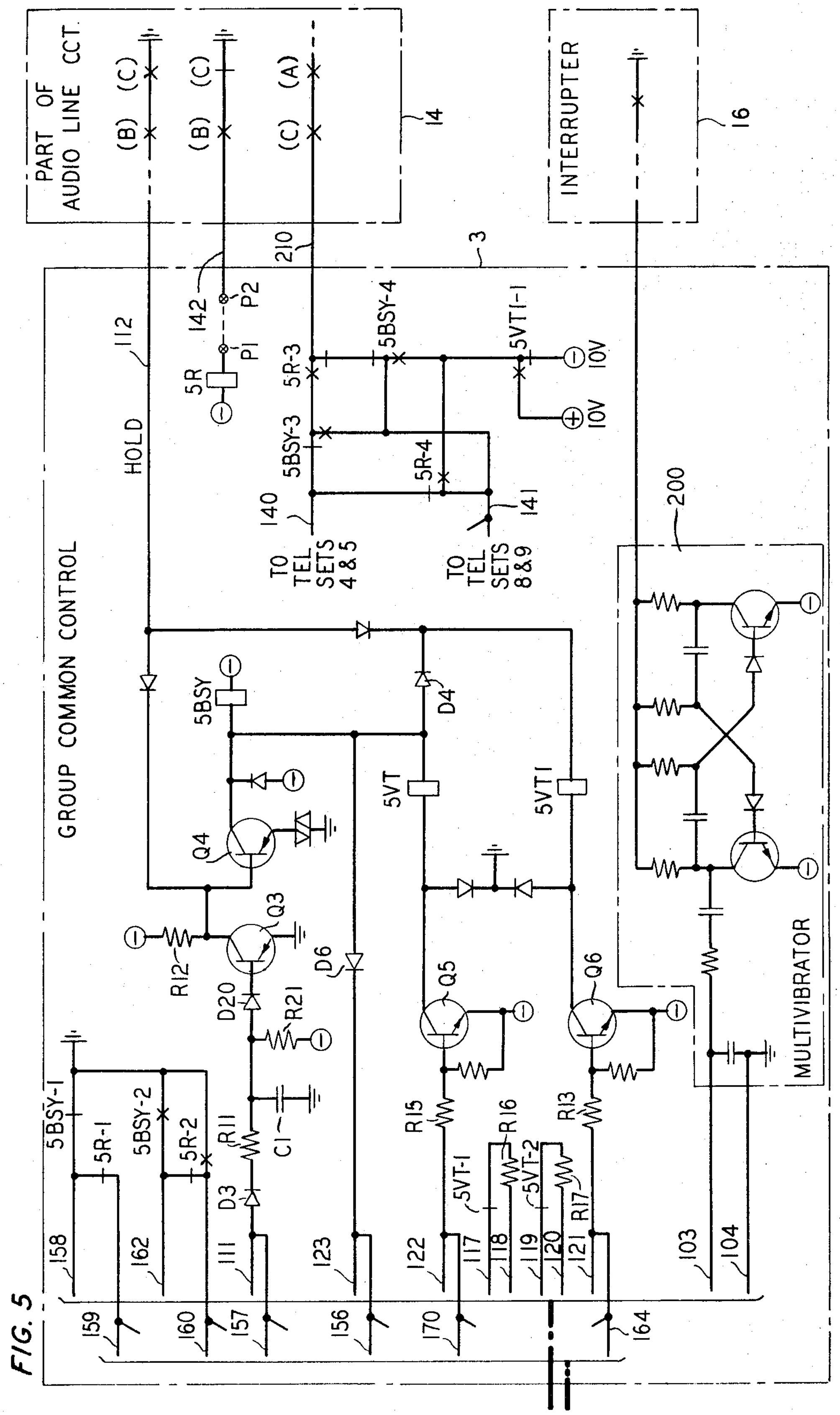

The following text will describe the embodiment of the invention in detail with references to FIGS. 2 through 5. A cursory examination of these figures will reveal that certain relay contacts and relay designations of audio line circuit 14 as shown in part in FIGS. 3 and 5 are enclosed in parentheses. The parenthetical symbol has been employed to facilitate a clearer understanding of the invention by indicating the operative apparatus which is more fully disclosed in prior art key telephone systems, such as the aforementioned Barbato et al. patent.

Figure 6:
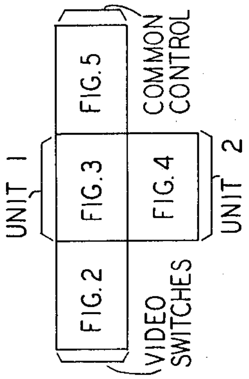
FIG. 6 shows the manner in which FIGS. 2 through 5 should be arranged.

Before proceeding with the detailed description, it is recommended that the reader refer to FIG. 6 and familiarize himself with the general drawing layout of FIGS. 2 through 5. It will be appreciated that efforts have been made to follow the general layout of FIG. 1.

It is considered that the best mode of describing this invention is to disclose the operation of the system in response to the depression of a key at one of the key station sets and to follow the circuit operation until an audio and wideband path have been completed to the enabling station. Following this description, there is a discussion of the circuit action responsive to a key depression to connect an incoming call to an enabling key station of the answering group. The foregoing will provide the basis for understanding the feature operation, Directed Call Transfer, and for appreciating circuit features such as Group Lockout which are discussed thereafter.

SELECTING THE COMMON FACILITY

Let us assume initially that the wideband path and the companion audio path are not in use and that the idle condition of these facilities is indicated as a dark lamp at each key station. Assume also that the subscriber at station B desires to establish an outgoing connection over the wideband facility. To seize the facility, the subscriber removes his handset from the cradle and depresses the associated pickup key. As a result of this action, a ground is applied to an A lead unique to station set 5. This lead is shown connecting to video switch 12 in FIG. 2.

The A lead ground connects to control unit 1 (FIG. 3) and to group common control 3 (FIG. 5), the latter containing the circuitry which permits key stations of group 1 to have exclusive access to the video quad and to the companion audio line. The A lead may be traced via conductor 113 to FIG. 3 and therein via diode D1 and resistor R10 to turn on transistor Q2. In turn, relay 3A operates via the collector circuit of transistor Q2, diode D2, contact 3B–3 and conductor 158 which can be traced to FIG. 5 and therein through contact 5BSY–1 to ground. In the event the channel is busy due to a connection to a different group, relay 5BSY is operated, thereby preventing the operation of relay 3A. For this discussion, however, we are assuming that the channel is available. In operating, relay 3A as shown at the top of FIG. 3 connects the audio path from telephone set 5 via conductors 107 and 108 and operated contacts 3A–1 and 3A–2 to audio line circuit 14. Note that the audio path from telephone set 4 is multipled via conductors 105 and 106 to telephone set 5. As a result station A can establish a bridge connection to the audio path by merely depressing the associated pickup key and going off hook. Relay 3A is locked to ground over operated contact 3A–5 to maintain the operated condition independently of the circuitry in common group control 3. Contact 3A–5 also opens a chained ground which connects to control unit 2 (FIG. 4) and to other control units (not shown) to prevent the simultaneous seizure of the common facility by more than one group. It is to be noted, however, that the facility is not entirely isolated from a connection to another group until relay 5BSY shown in FIG. 5 is operated.

The (A) relay of line circuit 14 is operated by the A lead ground via conductor 116 and diode D5. The operated contacts of the (A) relay (not shown) extend the audio path, conductors T and R, to the CO or PBX line. Other contacts of relays in circuit 14 (not shown), indicated by a dashed line, in the operating path of relay (A) in line circuit 14 prevent a false holding ground during a release sequence on any A lead ground from holding the (A) relay. The details of this circuitry are disclosed in the Barbato patent.

The A lead ground also operates the 5BSY relay to prevent a seizure of the common facility once it has been associated with a particular group. This ground may be traced beginning in FIG. 2 via conductor 113, diode D5 and conductor 111 to common control 3. The A lead ground furnishes a discharge path for capacitor C1 via resistor R11 and diode D3. In discharging capacitor C1 removes the forward bias from transistor Q3 which turns off. As a result, a path is established for turning on transistor Q4 via resistor R12. Relay 5BSY operates on the collector current of the latter transistor.

Relay 5BSY controls the station set lamp indications to furnish a busy indication upon the initial seizure of the channel. With reference to the right hand side of FIG. 5, operated contacts 5BSY–3, and 5BSY–4 and non-operated contact 5VT1–1 connect −10 volts to conductor 140 which in turn connects to the associated pickup key lamp assemblies at station sets 4 and 5. This voltage is also connected via the nonoperated contact 5R-4 and conductor 141 as well as contact 5BSY–4 to telephone sets 8 and 9. This negative voltage lights the clear lamp in each assembly indicating a busy facility and an audio-only call is in progress. As discussed subsequently, this lamp signal is replaced by a red lamp when a video prefix digit is dialed.

Relay 5BSY at contact 5BSY–1 (upper left hand corner of FIG. 5) opens the operating path for relay 4A (FIG. 4) to prevent its operation in the event the key associated with the common facility is depressed at station C or D while the channel is in use. When additional key groups are provided, the units associated with those groups are also wired to common control 3 in such a way that the operation of relay 5BSY opens the operating path for the relays in those units analogous to relay 4A. Wiring for succeeding group control units is shown in FIG. 4 at the bottom thereof and in addition comprises the multiple wiring depicted in FIG. 5 and associated with conductors 156, 157, 159, 160, 164 and 170. The multiple wiring is depicted as short line segments connected to the aforementioned conductors.

In addition to the foregoing, operated contacts of relay 5BSY establish a path for operating relay 3B in unit 1 and prepares a path for operating relay 4B in unit 2. The latter relay operates in the event the key associated with the common facility is depressed at stations C or D. The operating path for relay 3B comprises the collector circuit of transistor Q2, contact 3B–4, diode D3, conductor 162, and contact 5BSY–2 which connects to ground. Upon its operation relay 3B locks to ground via contact 3B–4 in order that relay 3B is held solely by the A lead ground. The operation of relay 3B at this time is not significant. However, the establishment of a path for operating relay 4B in the event a key is depressed at stations C and D is important in furnishing an audible busy tone to the intruding key station. Assume, for example, that a key is depressed at telephone set 8 and as a result with reference to FIG. 4 a ground appears on conductor 154 (A lead). This ground may be traced via diodes D7 and D8, and resistor R14 to turn on transistor Q7. The operating path for relay 4A is opened as previously described in common control 3. However, relay 4B operates via the collector current of transistor Q7 and contact 4B–4, diode D9, conductor 160, nonoperated contact 5R–2 and operated contact 5BSY–2 to ground. In operating relay 4B locks to ground via contact 4B–4. Operated contacts 4B–1 and 4B–2 couple the audio path, conductors 150 and 151, from telephone set 8 to a busy tone generator. It is noted that this path shown at the top of FIG. 4 also contains nonoperated contacts 4A–1 and 4A–2 and may be traced via conductors 103 and 104 to FIG. 5 and therein to multivibrator 200. The latter generates an audible tone interrupted at a rate controlled by interrupter 16. So long as the intruding key station remains off-hook with the key depressed for this facility, busy tone will be returned via the audio path. In addition, since relay 4B is operated, contact 4B–3 prevents the operation of relay 4A in the event the facility should become available while the intruding station is off-hook. Accordingly, it is necessary for an intruding key station to return to the on-hook condition after once hearing a busy tone before the idle facility can be connected to the station group.

The video quad is not cut through to originating station B until a video call is actually dialed. A video call is indicated by a special prefix digit dialed prior to dialing the address of the called subscriber. Upon receipt of the prefix digit, the CO or PBX returns a signal to audio line circuit 14 which thereinafter enters the video mode. This mode of operation is indicated by closure of contact (P) in line circuit 14 shown in FIG. 3. This contact closure grounds conductor 131 which operates relays 5VT, 5VT1, and 2VS. Relay 5VT1 operates from this ground over a path which includes conductors 131 and 121, resistor R13, and turned on transistor Q6. The collector circuit of transistor Q6 provides the battery potential for relay 5VT1 and ground is furnished from the collector circuit of transistor Q4 via diode D4. Operated transfer contact 5VT1–1 changes the station key lamp voltage from −10 volts to a +10 volts, causing a red lamp in each key assembly to become illuminated. Relay 2VS (FIG. 2) operates from the ground on conductor 131 over a path which includes contacts 3A–4 and nonoperated contact 3VS–1 and conductor 114. The battery potential for relay 2VS is supplied by the collector circuit of transistor Q1. Transistor Q1 is turned on in response to the A lead ground from telephone set 5. In operating relay 2VS closes its transfer contacts 2VS–1 through 2VS–4 to couple leads 132 through 135 to lead 117 through 120. The latter leads may be traced through FIG. 3 and therein through nonoperated contacts 3VS–2 through 3VS–5 and via conductors 123 through 126 to cable equalizer 15. It will be recalled that the video quad from the CO or PBX connects to equalizer 15.

The video quad is normally terminated by an idle circuit termination which consists of resistors R16 and R17 shown to the lower left of FIG. 5. Those resistors are connected via contacts 5VT–1 and 5VT–2 and conductors 117 to 120 to the quad. The idle circuit termination furnishes the proper condition for a test of the quad performed by the CO or PBX equipment. This termination must, however, be removed after the test and before video transmission can take place end to end. This is the function of relay 5VT. Upon the operation of relay 2VS a path is closed for operating relay 5VT. This path may be traced from conductor 131 via operated contact 2VS–5 conductor 122 which connects to FIG. 5 and resistor R15 to turn on transistor Q5. The collector circuit of transistor Q5 provides a battery potential to operate relay 5VT and the collector circuit of transistor Q4 furnishes ground to the opposite winding terminal.

SEIZURE OF THE QUAD BY A PREFERRED STATION

Let it be assumed that station B is connected to the video quad of the common facility. If station A depresses the pickup key for the common facility, video service unit 7 is disconnected from the quad and service unit 6 is connected in its place. In particular, the operation of the pickup key places a ground on conductor 112 (FIG. 3), the A lead associated with telephone set 4. This ground signal connects to the circuit entitled Video Switch For Station A which comprises transistor Q9 and relay 3VS. The signal turns on transistor Q9 which in turn operates relay 3VS. It is to be noted, however, that relay 3VS operates only if the video mode [(P) contact operated] has been previously established in audio line circuit 14. In operating, relay 3VS at its contacts 3VS–2 through 3VS–5 transfers the video quad from conductors 117 through 120 to service unit 6 cutting off the video picture at service unit 7.

If station A returns to the on-hook condition or selects another pickup key, the ground on lead 112 is removed, causing transistor Q9 to turn off and relay 3VS to release. This circuit action will restore the video image to service unit 7.

It is to be noted that the depression of a pickup key associated with the common facility by a preferred station user has no effect upon the audio path previously established between telephone set 5 and audio line circuit 14. The preferred station is bridged onto the existing audio path so that the key stations may converse under these circumstances.

INCOMING CALL

In the illustrative embodiment group 1 is chosen as the answering group and it receives all incoming calls over the common facility. As a consequence stations A and B only are furnished with an interrupted lamp signal as well as the customary audible ringing signal at their station sets and units. Stations C and D, as well as the stations (not shown) of all other groups, are locked out of incoming calls as soon as such calls are detected. These stations receive a customary audio-only busy lamp indication. If an attempt is made at stations C or D to connect to the common facility at this time, a busy tone is returned over the audio path. If the incoming call is a video-audio call, contact (P) shown in line circuit 14, FIG. 3, is closed to change the lamp signals to a red flashing lamp and to provide a special audible signal.

With reference to FIG. 5, ringing on the audio path is detected in the audio line circuit and in turn, relay 5R is operated. Details of the ringing signal detection circuit of line circuit 14, as well as the manner of connecting the ringers at each set to line circuit 14, is disclosed in the Barbato patent. In the present example only the ringers of station sets 4 and 5 connect to line circuit 14 since these stations answer all calls. Also the drawing only discloses the circuitry necessary to the operation of relay 5R. Line circuit 14 grounds conductor 142 as shown in the upper right hand corner of FIG. 5 for operating relay 5R. Relay 5R opens the operating path to relay 4A of control unit 2 (FIG. 4) and completes a portion of the operating path for relay 4B which operates in the event station C or D depresses the pickup key associated with the common facility. With reference to the upper left hand corner of FIG. 5, the operation of relay 4A is prevented by contact 5R–1 which removes the ground from conductor 159. Immediately below that circuit is shown contact 5R–2 which provides a ground on conductor 160 to permit the operation of relay 4B if a key is operated. As shown in FIG. 4 at the top center, contacts 4B–1 and 4B–2 connect the busy tone to telephone sets 8 and 9 as described hereinbefore.

Initially, telephone sets 4 and 5 receive a ringing lamp indication over a path which is shown in FIG. 5 and may be traced from audio line circuit 14 via conductor 210, operated contact 5R–3, nonoperated contact 5BSY–3, and conductor 140. As soon as the channel is seized by either station A or B, relay 5BSY operates and provides a steady lamp indication to the answering station. If a video mode is established in the line circuit, a positive voltage is applied over the previously traced circuit to register an appropriate signal at sets 4 and 5. Station sets of other groups, such as for example sets 8 and 9, receive a steady lamp indication under control of operated contact 5R–4. This path, also shown in FIG. 5, may be traced from −10 volts through nonoperated contact 5VT1–1, operated contact 5R–4 and conductor 141 which connects to telephone sets 8 and 9. It is to be noted that on a video call the signals at stations C and D to not reflect this call status until the call is answered and relay 5VT1 is operated.

Any station within the answering group may answer the call by depressing the pickup key associated with the facility and removing the station handset from its cradle. As described previously in the section headed "Selecting the Common Facility," this action causes the operation of relays 3A and 3B followed by the operation of relay 5BSY. In addition, if the incoming call is a video call, relay 3VS operates, assuming station A answers (relay 2VS operates if station B answers), and relays 5VT and 5VT1 also operate. When the call is answered, audio line circuit 14 removes ground from conductor 142 for releasing relay 5R. However, contacts of operated relay 5BSY prevent the establishment of group connections to other groups maintaining the exclusivity of the present connection.

Our equipment may be arranged so that all stations can receive incoming call indications. Moreover, any station may answer the call by establishing a group connection as previously described. If the equipment is modified by removing the strap coupling terminals P1 and P2, relay 5R does not operate when ringing is detected in line circuit 14. As a result, each of the stations receives the same lamp indication. With reference to FIG. 5, it may be seen that the lamp signal from line circuit 14 connects via conductor 210, nonoperated contacts 5R–3 and 5BSY–4 and conductors 140 and 141 to all stations sets. Also, the operating path for relay 4A, as well as for similar relays in other units, is connected to ground via nonoperated contact 5R–1. Thus, depression of a key at any station will operate the relays; namely, 4A, 4B, etc., necessary to establish a group connection as previously discussed.

HOLD

The common facility may be placed in a hold condition in a conventional manner by the station connected to the facility. Depression of the hold key at the station causes the operation of a hold relay (not shown) in audio line circuit 14. With reference to the upper right hand corner of FIG. 5 contacts (B) and (C) of the line circuit 14 connect ground to conductor 112 for turning off transistor Q4. As a result relay 5BSY releases. If a video-audio call is being processed over the common facility, relay 5VT1 is held operated by the ground conductor 112. This is necessary since relay 5VT1 controls the lamp indications for identifying the call as a video call. If we assume the hold key at station A is depressed, the A lead ground on conductor 112 is removed. Assuming also that station A only is connected to the facility, this action will turn off transistor Q9 (FIG. 3) and release relay 3VS which disconnects the video quad from service unit 6. In addition, the removal of the A lead ground removes one ground circuit maintaining transistor Q2 turned on. When transistor Q4 is turned off as previously described, the remaining holding circuit via contact 3A–3, conductor 123 and diode D6 is removed and transistor Q2 turns off. In turn, relays 3A and 3B release. Relay 5VT also releases, if previously operated, to place a terminating circuit, resistors R16 and R17, on the video quad.

When the common facility is in a hold condition, each station having access to the facility receives a special winking lamp under control of audio line circuit 14. This lamp signal may be traced in FIG. 5 from line circuit 14 via conductor 210 and nonoperated contacts 5R–3, 5R–4 and 5BSY–4 and conductors 140 and 141 to all telephone sets. Any station in any group may now depress the pickup key for the common facility and be connected to the audio and video lines via a group connection.

DIRECTED CALL TRANSFER

A controlling group can transfer a call by placing the common facility in a hold condition and by depressing a nonlocking signal key (not shown) to operate an external intercom circuit (not shown) to communicate with other key stations. After communicating with the other station and requesting that he pick up the call by depressing the common facility key, the answering station releases. Since a hold condition frees the facility for connection to all stations, the transferee station operates the pickup for the facility and answers the call.

Alternatively, a call transfer can be effected without the necessity for a separate intercom circuit by selectively lighting the pickup key lamps of a particular group. This can be accomplished with a single relay circuit (not shown) which steers the lamp circuit output, conductor 140 and 141, to particular stations or to all stations of a group. For example, a nonlocking signal key, providing one per group, can be furnished at any station in the answering group and a relay can be operatively associated with each key for switching the lamp conductors. If the hold key is actuated before the signal key is depressed, then break contacts of relay 5BSY can be utilized to lock up these special relays as well as to release those relays when the call is answered.

GROUP LOCKOUT

As previously discussed, the group selection and lockout control circuit shown in FIG. 5 comprises transistors Q3 and Q4, and relay 5BSY. When any station in a group selects the facility, relay 5BSY operates. Operated contacts 5BSY-1 and 5BSY-2 control the selection circuitry in other groups to prevent a connection to the facility.

During the time a station is connected to the facility, it may become necessary to flash an operator used originally in establishing the call. Ordinarily, the flash signal is generated by a momentary depression of the switchhook, or by dialing the digit 1. As a result the A lead ground is interrupted releasing, for example, relays 3A and 3B. To prevent the premature release of relay 5BSY and a consequent false connection to other groups who depress pickup keys in the flash interval, transistor Q3 is not turned as soon as the A lead ground is interrupted. Capacitor C1 begins to charge to negative battery via resistor R21 when the A lead ground is interrupted. Diode D20 is a zener type diode and prevents current flow into the base-emitter junction of transistor Q3 until a predetermined threshold is exceeded. Thus, capacitor C1 and R21 are selected to have a charging time sufficient to protect against premature release of relay 5BSY. Advantageously, the discharge circuit for capacitor C1 via resistor R11 is a fast response circuit permitting transistor Q3 to turn off rapidly.

It is to be noted that the wideband channel described herein as suitable for conveying video signals is also capable of data transmission such as facsimile and broadband carrier signals.

What we claim is:

1. A key telephone system arrangement comprising a first group and a second group of key stations, a common facility comprising a video channel and an associated audio line connecting to a switching office, each of said stations being equipped with individual telephone sets and video units, each of said sets including a key for selecting a connection to said facility, means determining the idle-busy condition of said facility, means controlled by said determining means and responsive to the operation of one of said keys at one of said stations in said first group for establishing an exclusive group connection to said first group, said connection exclusively enabling each station of said first group to access said line freely and to access said channel on a hierarchical basis, and means also responsive to the operation of said one key for connecting said audio line and said video channel directly to said respective telephone set and video unit of said one station.

2. The invention set forth in claim 1 further including means responsive to the operation of a second key at a preferred one of said stations in said first group for transferring said video channel from said one station to said preferred station, and means responsive concurrently to the operation of said second key for connecting said audio line to the one of said telephone sets associated with said preferred station.

3. The invention set forth in claim 1 further including means for generating a busy tone, and means responsive to the operation of one of said keys at any station within said second group for connecting said generating means thereto.

4. The invention set forth in claim 1 further including means responsive to the establishment of said group connection to said second group while said group connection is maintained.

5. The invention set forth in claim 1 further including a line circuit connected to said audio line comprising a holding circuit, key means at said one station connected via said group connection to said holding circuit for establishing a hold condition in said line circuit, and means actuated when said hold condition is established for releasing said group connection.

6. The invention set forth in claim 5 further including means responsive to the operation of a key at one of said stations in said second group for controlling the establishment of a group connection to said second group.

7. A key system arrangement comprising a plurality of key telephone stations each equipped with a station set as well as a video service unit, a wideband-audio communication path extending from a switching office, a key at each set for selecting a connection to said path, a line circuit and a video switch respectively terminating an audio and a wideband portion of said path, said stations being divided into key groups and each group of stations being associated with a group control unit, a common group circuit connected to each control unit for controlling connections to said path, each of said control units being actuated in response to the depression of one of said keys at one of said stations in said associated group for signalling said group circuit, said group circuit thereafter cooperating with said actuated control unit for completing a group connection from said line circuit and said video switch to all of said stations in said associated group, said actuated group circuit being also controlled by said key depression for extending a direct connection from said audio line circuit to a station set associated with said one station as well as a video connection from said video switch to said video service unit associated with said one station, means controlled exclusively from said stations of said associated group for establishing bridging connections between said audio line and said sets of said associated group, and means controlled by preferred ones of said stations in said associated group for transferring said video connection to one of said video service units associated with said preferred stations.

8. A key telephone system arrangement including a plurality of key stations divided into at least two station groups, each of said groups comprising two or more key stations, a data channel and a companion audio line extending from a switching exchange, means associated with each of said groups for establishing a group connection from the stations within an associated group to said channel and to said line, said group connection allowing particular ones of said stations of said associated group to connect to said line and channel, means responsive to the establishment of a first group connection to any one of said groups for inhibiting the concurrent establishment of a second group connection, a key at each of said stations for selecting a connection to said channel and line, means generating a busy tone, and means responsive to a key operation at an enabling one of said stations which is not included in said first group for connecting said generating means to each of said stations of said group which includes said enabling station.

9. The arrangement set forth in claim 8 further including means responsive to a signal over said first group connection for establishing a hold condition on said line and channel, and means responsive to the establishment of said hole condition for releasing said first group connection.

10. The invention set forth in claim 9 further including means responsive to said holding condition for controlling said inhibiting means so that said second group connection can be established from any one of said groups to said data channel and companion audio line.

11. An arrangement for restricting access to a common communication facility shared by a plurality of key telephone stations, wherein said stations are separated into key groups each containing at least two key stations, comprising means responsive to the depression of a key at an enabling one of said stations for associating said facility with a particular one of said groups which includes said enabling station, said one group being thereafter the controlling group, means concurrently responsive to said key depression for connecting said facility directly to said enabling station, means actuated by said associating means and responsive to a key depression at ones of said stations which are not included in said controlling group for sending a busy indication thereto.

12. The arrangement set forth in claim 11 further including means for detecting an incoming unanswered call to said key stations on said facility, means controlled by said detecting means for associating a prescribed one of said key groups with said facility without the necessity for a key depression, and means controlled by said detecting means for inhibiting connections between said facility and key groups other than said prescribed key group.

* * * * *